United States Patent
Heide et al.

(10) Patent No.: US 10,155,633 B2
(45) Date of Patent: Dec. 18, 2018

(54) METHOD AND CONTAINER TRANSFER INSTALLATION FOR PLACING CONTAINERS INTO AND REMOVING CONTAINERS FROM CONTAINER STORAGE AREAS

(71) Applicant: AMOVA GMBH, Netphen (DE)

(72) Inventors: Carsten Heide, Netphen (DE); Volker Brueck, Mudersbach (DE); Michel Bannert, Siegen (DE)

(73) Assignee: AMOVA GMBH, Netphen (DE)

( * ) Notice: Subject to any disclaimer, the term of this patent is extended or adjusted under 35 U.S.C. 154(b) by 0 days.

(21) Appl. No.: 15/536,217

(22) PCT Filed: Apr. 14, 2015

(86) PCT No.: PCT/EP2015/058094
§ 371 (c)(1),
(2) Date: Jun. 15, 2017

(87) PCT Pub. No.: WO2016/165748
PCT Pub. Date: Oct. 20, 2016

(65) Prior Publication Data
US 2018/0002119 A1    Jan. 4, 2018

(51) Int. Cl.
*B65G 1/06*    (2006.01)
*B65G 63/04*    (2006.01)
(Continued)

(52) U.S. Cl.
CPC ......... *B65G 63/045* (2013.01); *B65G 63/004* (2013.01); *B66C 19/002* (2013.01)

(58) Field of Classification Search
CPC .. B65G 63/004; B65G 63/045; B65G 63/025; B65G 1/0407; B66C 19/002; B66C 17/20
See application file for complete search history.

(56) References Cited

U.S. PATENT DOCUMENTS 3,559,822 A * 2/1971 Lichtenford ......... B65G 1/0407
                                                    414/140.3
5,039,275 A   8/1991 Ide
(Continued)

FOREIGN PATENT DOCUMENTS

DE          4439740 B    5/1996
DE    102008007860 A   10/2009
(Continued)

*Primary Examiner* — Gregory W Adams
(74) *Attorney, Agent, or Firm* — Andrew Wilford

(57) ABSTRACT

The invention relates to a method and to a container transfer installation (2, 102) for placing containers into and removing containers from or transferring containers (1) in high-rack or block storage arcs (3, 15) of a seaport or inland port within a container transfer installation (2, 102) having an integrated, fully automatic container transport system. An accelerated process having high total throughput is achieved in that individual containers (1) are deposited by the at least one loading gantry (6) successively onto pallets (19) or transverse conveying carts (18) provided on a transfer cart (8; 8a, 8b) that at least has an upper and a lower accommodating and conveying level (I, II) and can be moved parallel to the container storage area (3, 15), and the pallets (19) loaded with a container (1) are led over means of pallet transverse conveying means (25) or the containers (1) are led over by means of the transverse conveying carts (18) of the transfer cart (8; 8a, 8b) from the transfer cart onto an end distribution vehicle (9; 9a, 9b), which can be moved parallel to the container storage area (3, 15) and is positioned in line before the transfer cart (8; 8a, 8b) and has an upper and a lower level (I, II) and are led over by means of transverse conveying means (20; 25) from the end distribution vehicle onto a stationary transfer station (10) of the container storage area (3, 15), which transfer station likewise has an upper and a lower level (I, II) and from which transfer station a storage area crane (12) lifts the container (1) in order to place the container in the container storage area (3, 15).

12 Claims, 7 Drawing Sheets

(51) Int. Cl.
 *B66C 19/00* (2006.01)
 *B65G 63/00* (2006.01)

(56) References Cited

U.S. PATENT DOCUMENTS

| | | | | |
|---|---|---|---|---|
| 6,602,036 B2 * | 8/2003 | Takehara | ............. | B65G 63/004 |
| | | | | 212/344 |
| 7,686,558 B2 * | 3/2010 | Tian | .................... | B65G 63/004 |
| | | | | 414/139.9 |
| 8,087,867 B2 * | 1/2012 | Tian | .................... | B66C 19/002 |
| | | | | 212/318 |
| 8,206,074 B2 * | 6/2012 | Benedict | ............. | B65G 63/004 |
| | | | | 414/140.3 |
| 2003/0047529 A1 | 3/2003 | Dobner | | |
| 2007/0134076 A1 * | 6/2007 | Tian | .................... | B65G 63/004 |
| | | | | 414/139.4 |
| 2010/0239402 A1 | 9/2010 | Holmedal | | |

FOREIGN PATENT DOCUMENTS

| | | | | |
|---|---|---|---|---|
| EP | 1798169 A2 | * | 6/2007 | ........... B65G 63/004 |
| JP | 01294121 A | * | 11/1989 | |
| JP | 10194463 | * | 7/1998 | ........... B65G 63/004 |
| WO | WO-0071452 A1 | * | 11/2000 | ........... B65G 63/004 |
| WO | WO-2004071911 A1 | * | 8/2004 | ........... B65G 63/004 |

\* cited by examiner

METHOD AND CONTAINER TRANSFER INSTALLATION FOR PLACING CONTAINERS INTO AND REMOVING CONTAINERS FROM CONTAINER STORAGE AREAS

CROSS REFERENCE TO RELATED APPLICATIONS

This application is the US-national stage of PCT application PCT/EP2015/058094 filed 14 Apr. 2015.

FIELD OF THE INVENTION

The invention relates to a method of storage and retrieval or rearrangement of containers in high-bay storage facilities or block facilities of a seaport or an inland port within a container transfer installation with an integrated fully automated container transport system comprising, for transfer of the containers from a ship to land and conversely, at least one gantry crane and at least one storage-facility crane, by which the containers are stored and retrieved or rearranged in the storage facility, wherein several levels are provided in the transfer procedure between a gantry crane and the storage-facility cranes for the containers. In addition, the invention relates to a container transfer installation for carrying out the method.

BACKGROUND OF THE INVENTION

A transfer installation in a seaport and an inland port for, in particular, standard containers such as 20 TEU or 40 FEU containers with a container storage facility, which is provided along a quay and consists of individual line-like storage modules, in the form of a block storage facility and at least one loading installation, which co-operates with the storage modules, for load transfer from and to a ship berthed at the quay has been made known through EP 1 272 414 [US 2003/0047529]. The storage installation for load rearrangement is equipped with at least one movable port mobile crane, the pivotable load jib of which reaches into the region of at least one transfer location, which is provided within the container storage facility—which consists of a number of storage modules with a number of container rows dependent on the module width—and forms an interface between the port mobile crane and the storage modules of the container storage facility.

A container deposited by the pivotable jib of the port mobile crane on the transfer location is directly picked up thereat by a storage-facility crane, which takes over horizontal transport and stacking of the containers. The storage-facility crane is constructed as an elevated gantry crane with a traveling crab and in each instance spans a storage module, which is, for example, nine containers wide and three to four containers high, of the container storage facility extending transversely to the quay. The storage modules are linked together by at least two transverse transporters that are movable on rail tracks extending transversely to the individual storage modules in different horizontal planes and that operate independently of one another. The containers are stacked one above the other, in which case the stack height is limited by the load-bearing capability of the individual containers; consequently, usually at most six containers are stacked one above the other in a block storage facility.

It is known from DE 10 2008 007 860 A1 to store and retrieve containers in any number one above or alongside the other individually in bays of a high-bay storage facility. In that case the containers are individually accessible by means of a gantry crane, which in each instance spans a lane between two adjacent storage facility modules, and are introduced with some spacing one above the other into the multi-storey bays, which are equipped at both longitudinal sides and in the direction of the bay depth with guide rails corresponding with the width of the containers, which are introduced by the ends thereof into the bay. The gantry crane movable over the lanes carries a container receiver that is raisable and lowerable by means of cables and is arranged on a transfer bridge equipped with guide rails and that at its ends has container grippers, these being adjustable in height by way of motor drive or hydraulically and being lockable with suspension points of the containers at the corners. For adaptation to different lengths of the containers the container receiver has support beams that are adjustable in length and at which the container grippers are provided.

In the case of the container terminal known from DE 4439740 C1 high transfer rates such as have to be ensured by, for example, the use of several loading or container gantries at a ship are achieved in co-operation with the storage-facility cranes by a fully automated container transport system integrated within a container transfer installation. For that purpose, travel track levels offset in height and with loading and unloading positions are arranged on a step-shaped support construction offset in height and are connected together by a plurality of supports, each level having a travel track network with a plurality of transport pallets movable thereon and driven by linear motor. Apart from the fact that a very large number of transport pallets specially constructed with linear motor drives as contactless drive means is needed, a substantial outlay on steel construction is inevitable due to the travel track network, since each level has a plurality of interconnected travel tracks for movement of the transport pallets on a travel track network to loading and/or unloading and/or junction positions. The different or individual levels connected together by supports are predetermined by a step-shaped support construction offset in height.

OBJECT OF THE INVENTION

The invention has the object of creating a method and a container transfer installation of the kind stated in the introduction, which in simpler manner enables a more reliable and, in particular, an accelerated, fast container transfer even with very high piece numbers. In that case, the outlay on plant shall be reduced by extensive utilization of already existing equipment (loading or container bridges, high-bay or block storage facility structures, storage facility or bridge cranes, storage and retrieval units movable in the lanes of a high-bay storage facility).

SUMMARY OF THE INVENTION

According to the invention this object is fulfilled by a method in which individual containers are delivered from the at least one gantry crane successively to pallets or transverse conveying carriages provided on a take-over carriage having at least one upper and at least one lower receiving level and conveying level and movable parallel to the container storage facility, from which take-over carriage the pallets laden with a container are transferred by pallet transverse conveying means, or the containers are transferred by the transverse conveying carriages of the take-over carriage, to an end distributor vehicle, which is movable parallel to the container storage facility and is positioned in line in front of the take-over carriage and that like the take-over carriage has an upper level and a lower level, and transferred from this by transverse conveying means to a stationary transfer station, which similarly has an upper level and a lower level, of the container storage facility, from which a storage-facility crane lifts the containers for storage in the container storage facility.

A decoupled container transfer able to manage very high piece numbers in continuous operation of all components involved can thereby be achieved. Thus, for example, associated with a gantry crane and the take-over carriage co-operating therewith can be two or—depending on the performance capability of the gantry crane—several end distributor vehicles. As soon as the first end distributor vehicle has removed the containers from the two levels (always called just "level" for short in the following instead of receiving level and conveying level) or—in an optional construction of the end distributor vehicle with pallet return on the lower level—from the upper level of the take-over carriage and is thus loaded, the first end distributor vehicle can for further handling of the containers be moved to one of several stationary transfer stations of the container storage facility and at the same time the second end distributor vehicle can be positioned for furnishing with following containers. In the case of simultaneous operation with a plurality of gantry cranes a take-over carriage is preferably associated with each gantry crane. For section-by-section unloading or loading of the ship by only one gantry crane this can be moved, just like the associated take-over carriage, at the quay to each section. If the width of the levels of the components involved is designed in accordance with the largest container dimension, two 20 TEU containers can be transferred simultaneously in each level instead of a 40 FEU container.

According to an embodiment of the invention the take-over carriage and the end distributor vehicle move on rails, which assists aligned positioning of the vehicles by their levels relative to one another.

A proposal of the invention provides that in the case of construction of the container storage facility as a high-bay storage facility the take-over carriage and the end distributor vehicle are moved on elevated rails and the stationary transfer station is provided in the two uppermost floors of the high-bay storage facility, in which case the take-over levels, which correspond with the two levels of the take-over carriage, of the end distributor vehicle can be fixedly installed load receiving means or a vertically adjustable load receiving means of the end distributor vehicle is positioned at the respective level to be serviced. Due to the height of the travel tracks the gantry crane does not have to lower the containers to the quay floor level. By virtue of the omission, as far as possible, of the vertical lowering movement the use of energy and, additionally to the acceleration achieved through the decoupling of the functions, also the cycle time can be further reduced.

In preferred manner the invention provides that a front section, which faces the quay side, of the pallet transverse conveying means of the take-over carriage and a rear section, which faces in the direction of the container storage facility, of the pallet transverse conveying means of the stationary transfer station can be lowered or raised from the lower level to the upper level and conversely, wherein the pallet transverse conveying means in both the lowered and raised end position extend in alignment with pallet transverse conveying means of the interposed end distributor vehicle. The take-over carriage, when the front section is lowered, is loaded with a pallet or two mutually adjacent pallets in the lower level, in which case, however, after raising of the front section and loading of the pallets with a container the onward guidance of the container takes place by way of only the upper level of the end distributor vehicle. In the stationary transfer station the containers arriving at the upper level of the end distributor vehicle are successively taken over by the storage-facility crane or two storage-facility cranes for introduction into the container storage facility. The unloaded pallets are then successively lowered to the lower level and transported back by transverse conveyors to the take-over carriage for reuse. In the case of a high-bay storage facility the storage-facility cranes deliver the containers for further handling to storage and retrieval units movable in the storage facility lanes to the respective bays.

According to the invention the above-described mode of operation makes it possible for empty pallets, after lowering to the lower level, to be able to be conveyed from the stationary transfer station by way of the lower level of the end distributor vehicle back to the lower level of the take-over carriage. A closed pallet circuit or circulation can thus be achieved, for which, for example, six pallets available for use are needed. In addition, the end distributor vehicle in that case serves as a coupling element from the transfer station to the take-over carriage.

A container transfer installation for carrying out the method is characterized in that associated with a gantry crane toward the container storage facility on respective tracks extending parallel to the container storage facility are first a take-over carriage and adjacent to the container storage facility at least one end distributor vehicle, wherein the end distributor vehicle is movable independently of the take-over carriage and positionable in alignment with a stationary transfer station formed at least at the feed side of the container storage facility and arranged in the operating range of a storage-facility crane, wherein the take-over carriage, the end distributor vehicle and the stationary transfer station are each constructed at least with an upper and a lower receiving level and conveying level and container and/or pallet transverse conveying means provided thereat. The decoupled functions of the different container handling components make a variable and rapid transfer possible, wherein merely the end distributor vehicle is positioned in alternation with its levels aligned in front of the take-over carriage and aligned in front of a stationary transfer station. The transfer rate can be readily adapted to any logistical requirements by the use of several take-over carriages and, in particular, end distributor vehicles.

According to one embodiment of the invention the take-over carriage and the end distributor vehicle are movable in track-bound manner, namely on elevated rails in the case of construction of the container storage facility as a high-bay storage facility. The thereby-reduced use of energy and the reduced cycle time have already been described.

An embodiment of the invention provides that the levels of the take-over carriage are provided at a fixed spacing from one another and the associated end distributor vehicle is constructed as a storage and retrieval unit with an upper and a lower load receiving means or a vertically adjustable load receiving means for successive removal of the containers from the upper and lower levels of the take-over carriage. The transverse conveying means of the frame-like storage and retrieval unit are preferably telescopic forks or arms that are provided at the load means and that remove the containers, suspended at the corner catch points thereof, from the take-over carriage or, in this construction without pallets, from the transverse conveying carriage thereof arranged to be reciprocable in the two levels, and conduct the containers onward to the transfer station.

According to a refinement of this embodiment the associated stationary transfer station has in the lower level a transverse conveyor section projecting relative to the upper level in the direction of the container storage facility. The containers can thus be positioned offset relative to one another and are therefore freely accessible in both levels for the at least one storage-facility crane.

A preferred embodiment of the invention with containers transversely conveyed on pallets provides that the take-over carriage is constructed with an upper level divided into two and has a front part-level section lowerable and raisable from the upper to the lower level and conversely, wherein the associated end distributor carriage is constructed with a continuous upper level receiving the containers fed from the take-over carriage and the projecting transverse conveyor section of the stationary transfer station is constructed with lifting means lowerable and raisable from the upper to the lower level and conversely. Through this mode of construction it can be achieved that the end distributor vehicle further conveys the pallets, which are laden with the containers, only at its upper level, whereas the lower level in co-operation with, on the one hand, the lower level of the stationary transfer station and, on the other hand, after movement of the end distributor carriage into alignment with the lower level of a take-over carriage brings the empty pallets into use in a closed circuit.

According to the invention it is proposed that the front part-level section of the take-over carriage and the projecting transverse conveying section of the stationary transfer station are constructed with scissor lifting tables. The scissor lifting tables are designed with a stroke bridging over the spacing of the levels.

The transverse conveying means transporting the containers deposited on pallets can, in accordance with a proposal according to the invention, be constructed as a roller conveyor or roller track or, in the case of transport of the containers without pallets, as a transverse conveying carriage. The transverse conveying means are an integrated element of the plant components.

BRIEF DESCRIPTION OF THE DRAWING

Further features and details of the invention are evident from the claims and the following description of embodiments of the invention schematically illustrated in the drawings, in which:

SPECIFIC DESCRIPTION OF THE INVENTION

Figure 1:
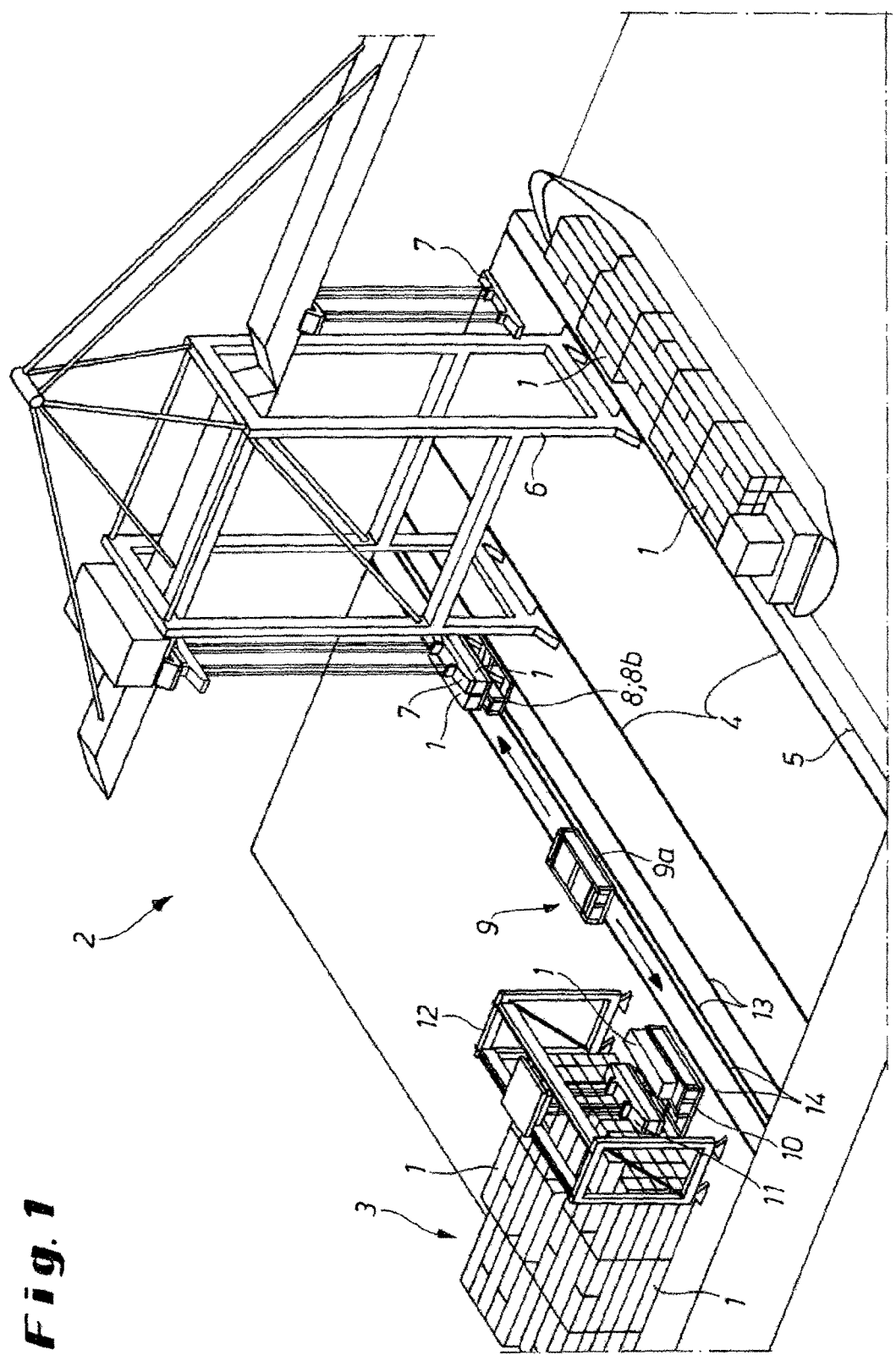
FIG. 1 shows a container transfer installation in a perspective plan view with a ship berthed at the quay for unloading, a gantry crane, a take-over carriage, an end distributor carriage and a container storage facility as a block storage facility with transfer station and storage-facility crane at the feed side, wherein the take-over carriage, the end distributor carriage and the transfer station successively transversely convey the containers, which are deposited on pallets, at an upper level, whereas the empty pallets are transported back at a lower level of these components.
Figure 2:
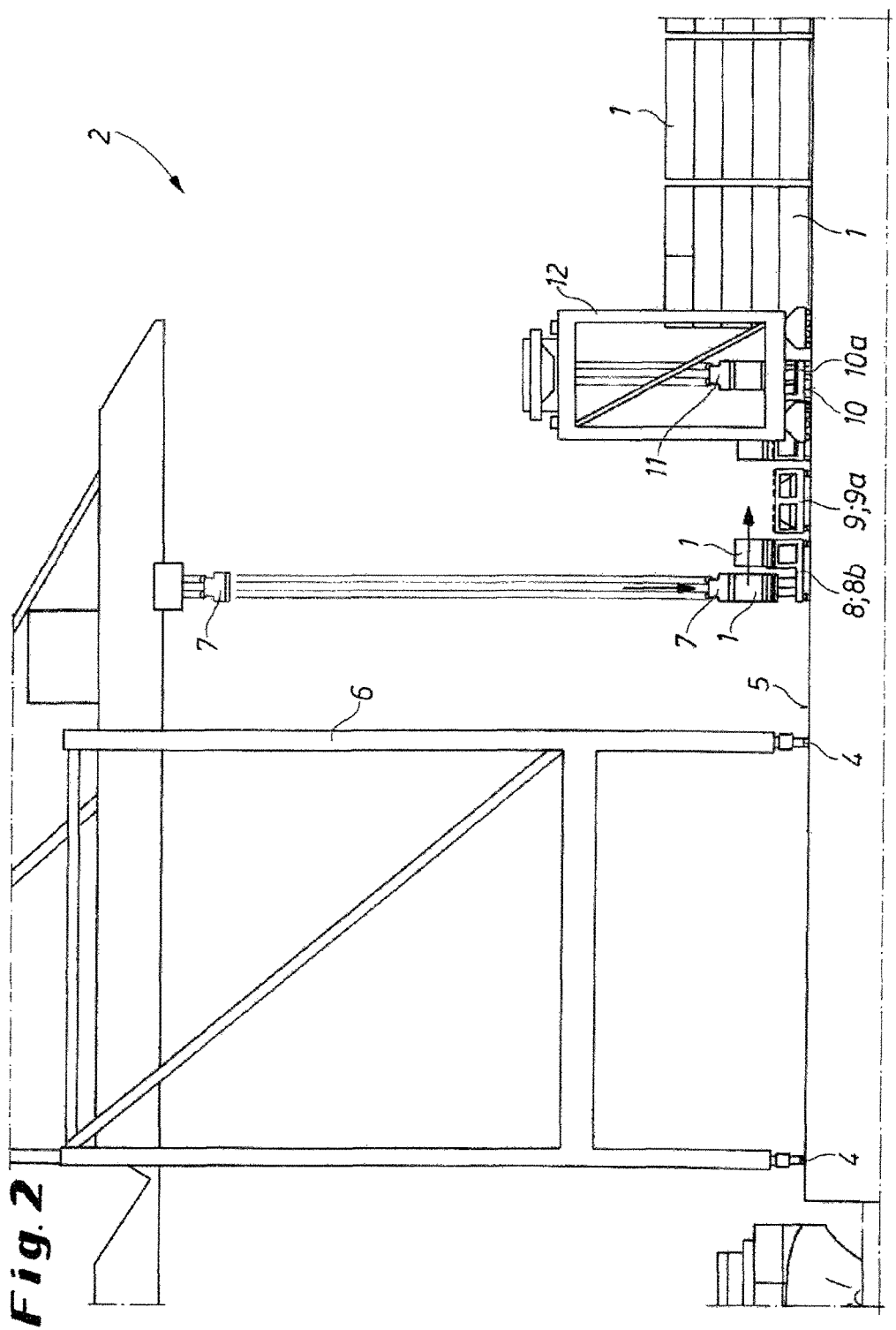
FIG. 2 shows the container transfer location of FIG. 1 in a side view.

A container transfer installation 2 with a block storage facility 3, of which only one of several loading units disposed adjacent to one another at a spacing is shown, for transfer of containers 1 from a ship to land and conversely is illustrated in FIGS. 1 and 2. The containers 1 are removed by a gantry crane 6, which is positionable on a rail track 4 in the quay floor 5 in front of the ship, by the load receiving means 7 of the gantry crane, deposited on a take-over carriage 8, transferred from this to an end distributor vehicle 9, which in the embodiment according to FIGS. 1, 2 as well as 5 and 7 is constructed as a flat vehicle 9a of modular construction, transported to a stationary transfer station 10 of the block storage facility 3, transferred to the stationary transfer station 10 and removed thereat by a lifting means 11 of a storage-facility crane 12, which spans the storage unit of the block storage facility 3, and stored, for which purpose the storage-facility crane 12 is movable in the direction of the length dimension of the block storage facility or the storage unit and thus transversely to the block storage facility 3. Ship loading takes place in reverse sequence. The take-over carriage 8 is arranged, just like the end distributor vehicle 9, on rail tracks 13 and 14 extending at the feed side of the block storage facility parallel to the block or container storage facility, wherein the rail track 14 of the end distributor vehicle 9, 9a extends directly adjacent to the stationary transfer station 10, of which several are provided adjacent to one another to be distributed at a spacing.

Figure 3:
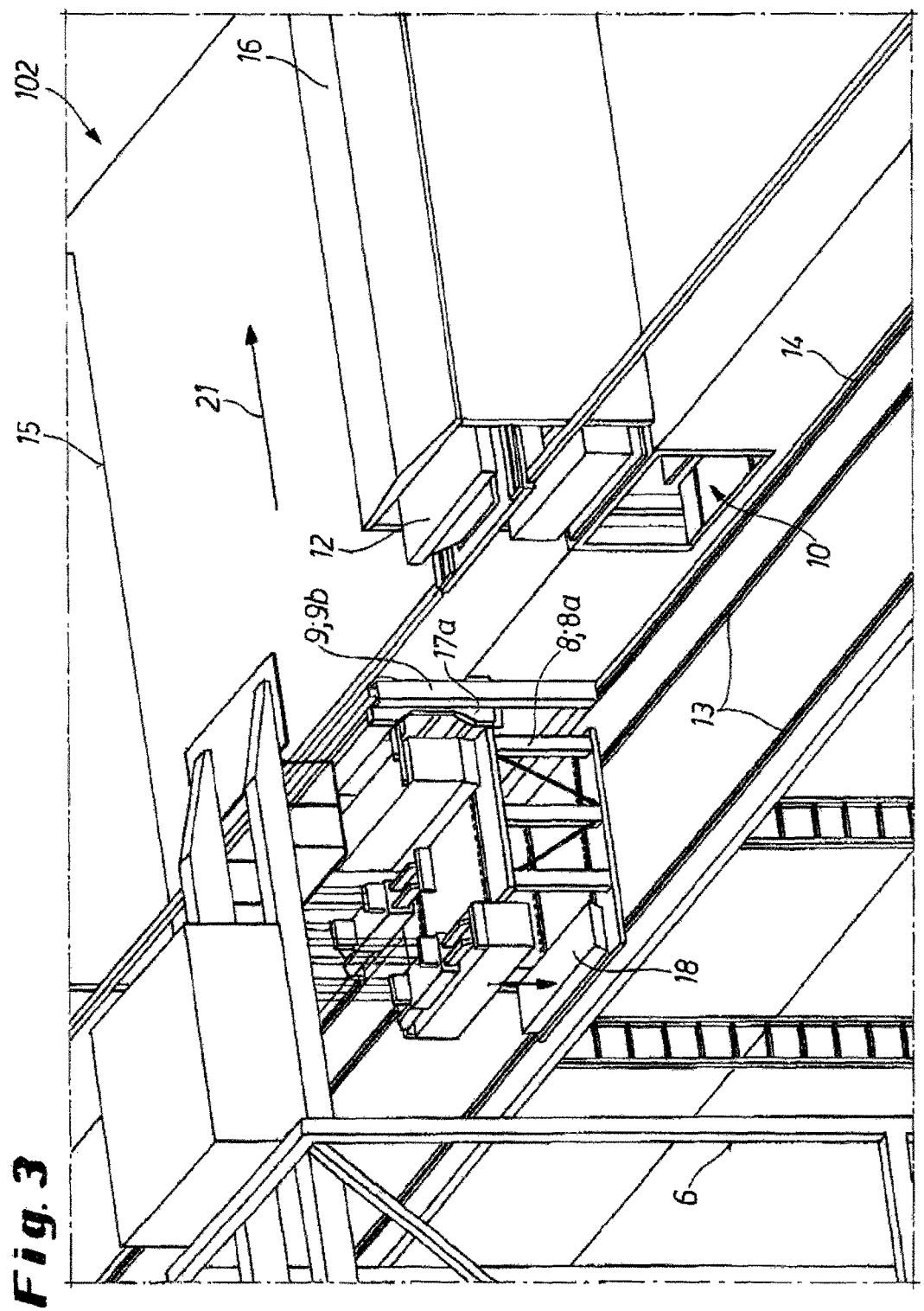
FIG. 3 shows, in a perspective plan view as a part view, a container transfer location with a high-bay storage facility as container storage facility, and a take-over carriage and an end distributor vehicle arranged on elevator tracks and constructed in a different form for transverse conveying of containers by means of displaceable transverse conveyor carriages at both an upper level and a lower level.
Figure 4:
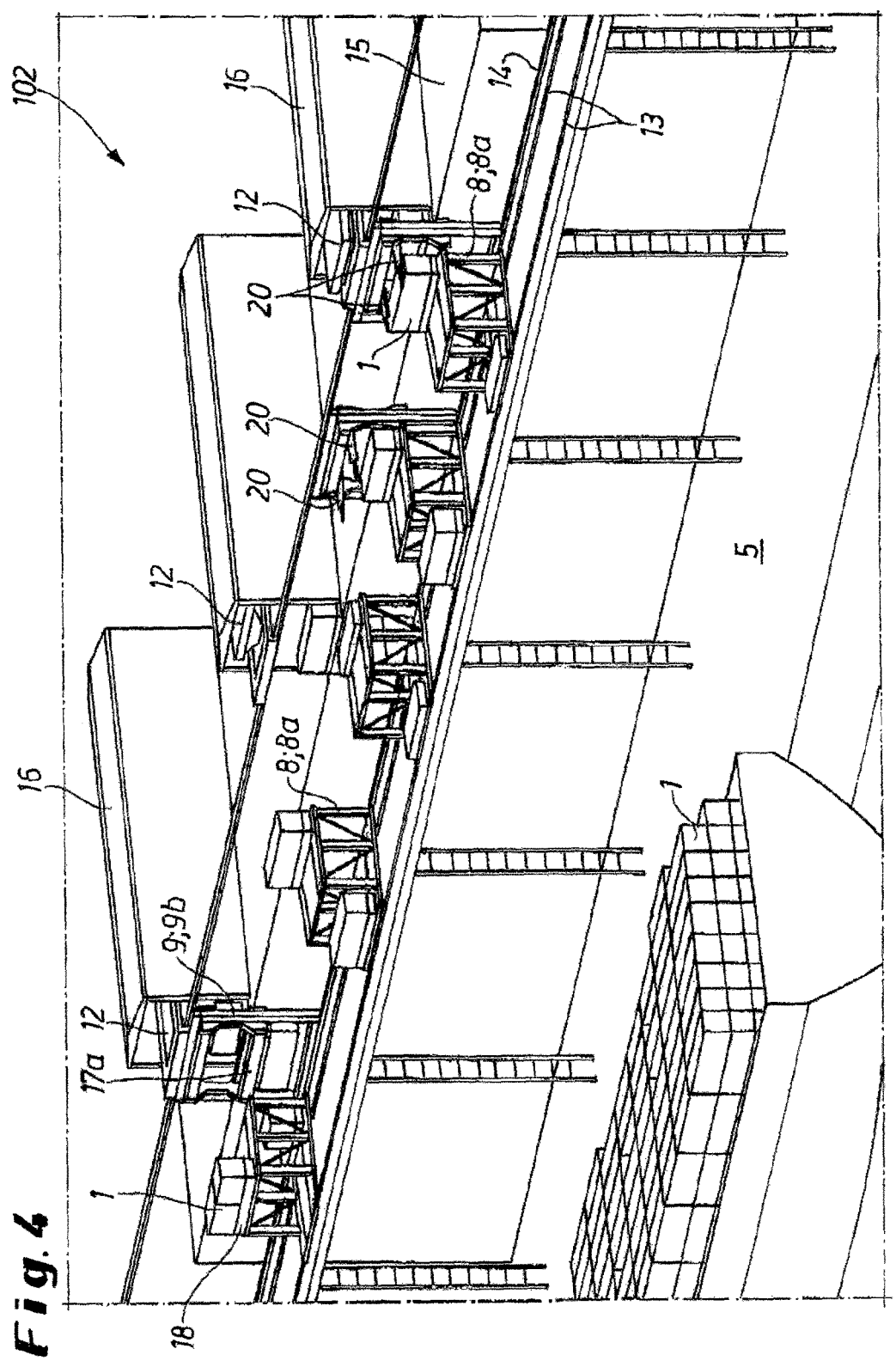
FIG. 4 shows, as a part view of a container transfer installation in a perspective front view, the high-bay storage facility of FIG. 3 without gantry cranes, with take-over carriages arranged in different positions and end distributor vehicles constructed as storage and retrieval units.
Figure 5:
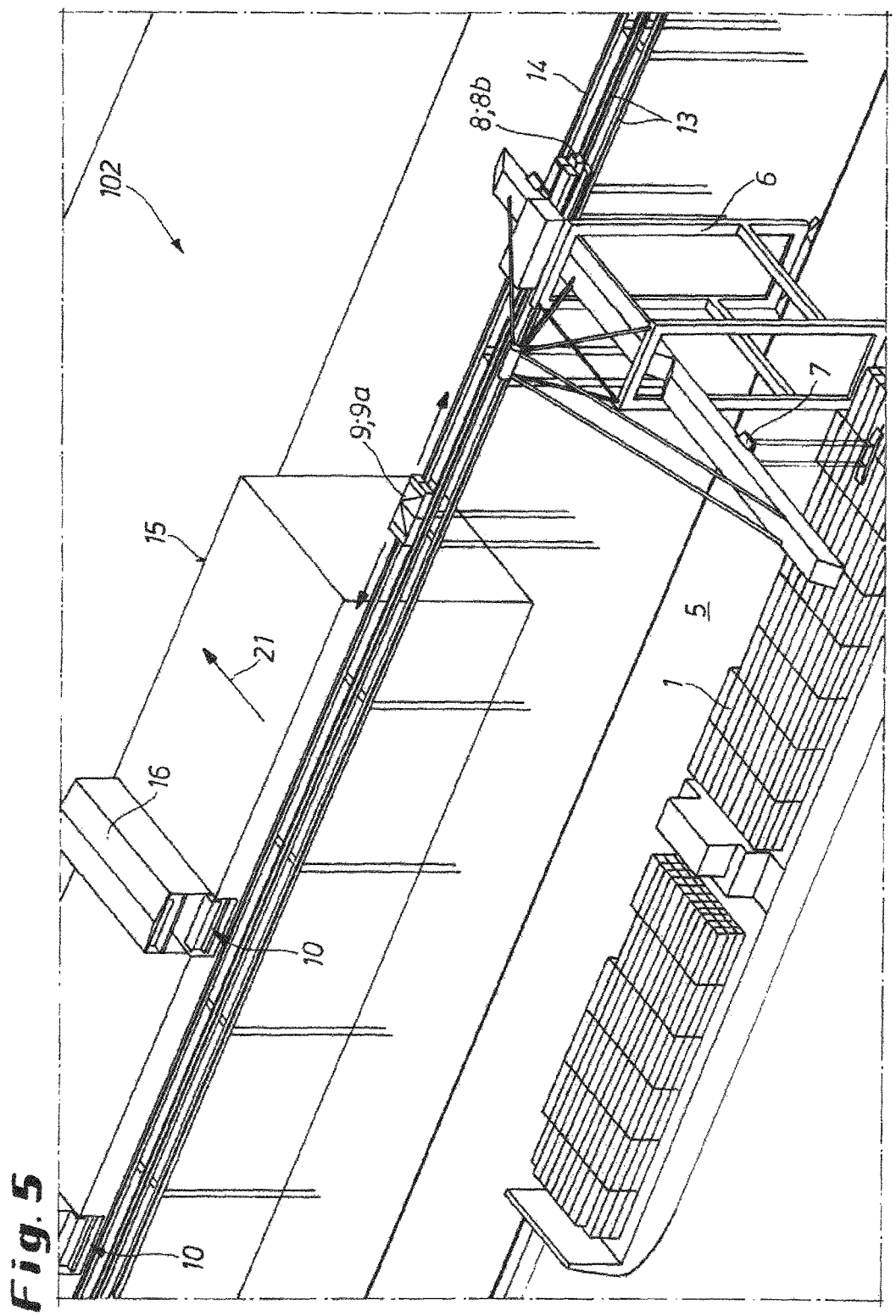
FIG. 5 shows, in a perspective part view as seen from above, a container transfer installation with a high-bay storage facility and vehicles that are movable and positionable on parallel rail tracks in front of the feed side of the high-bay storage facility, here in an embodiment of the end distributor carriage, which is arranged directly adjacent to the high-bay storage facility, in a mode of construction as illustrated in FIGS. 1 and 2.

The container transfer installation 102 of FIGS. 3, 4 and 5 is constructed with a high-bay storage facility 15 as container storage facility and the rail tracks 13, 14 for the take-over carriage 8 and the end distributor vehicle 9, which in the embodiment according to FIGS. 3 and 4 is constructed as a storage and retrieval unit 9b (see also FIG. 6), are arranged to be elevated. The stationary transfer stations 10 are integrated in the steel structure on the two uppermost floors of the high-bay storage facility 15. The storage-facility crane or storage-facility cranes 12 is or are compartmented by roof superstructures 16 and cover the storage facility lanes to engage over all multi-floor bay installations, which are arranged to be separated from one another at a spacing in succession rearwardly in the plane of the drawing. Transport tied to the floor is eliminated in the case of container transfer installations 102 with high-bay storage facilities 15. The transfer procedures otherwise correspond, since the containers 1 are brought from the ship to the take-over carriage 8 by means of the gantry crane 6, transferred thereat to the variable reciprocable end distributor vehicles 9; 9a, 9b, moved by these until in front of a free stationary transfer station 10 and transferred to the transfer station, from which the containers 1 are taken over by the storage-facility crane 12 and stored in the block storage facility 3 or delivered by the storage-facility crane 12 of the high-bay storage facility 15 to storage and retrieval units movable on rails in the storage facility lanes, which units then take over distribution, at the storage facility side, of the containers in the bays.

The flexible handling of the containers 1 achievable by decoupling of the functions of take-over carriage 8, end distributor vehicle 9—here in the form of storage and retrieval units 9b—and stationary transfer stations 10 with the possibility of direct coupling of these components can be seen in FIG. 4, in which the gantry cranes associated with the take-over carriages 8, 8a are not shown. Whilst take-over carriages 8; 8a freed of the containers to be stored are prepared for reloading, other take-over carriages deliver the containers to the end distributor vehicles 9; 9b or laden end distributor vehicles can transfer the containers to stationary transfer stations 10. The container transfer thereby already significantly accelerated offers an overall throughput performance increased still further in that the take-over carriage 8; 8a, 8b, the end distributor vehicle 9; 9a, 9b and the stationary transfer station 10; 10a, 10b are each constructed with an upper level 1 and a lower level 11 for reception of containers 1 at both levels 1, 11 (see FIG. 6) or at the upper level 1, in which case the lower level 11 is used for return transport of empty pallets (see FIG. 7).

Figure 6:
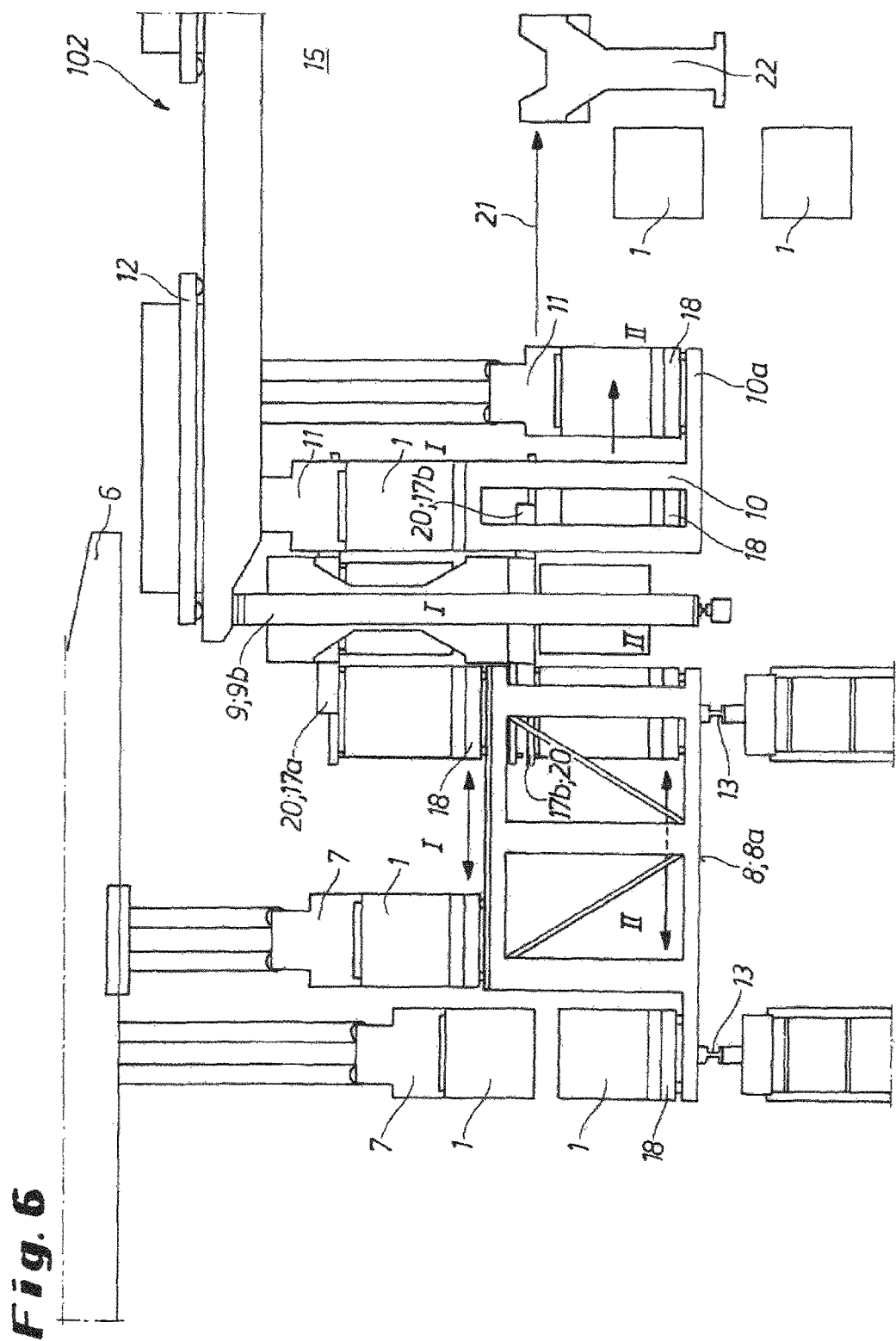
FIG. 6 shows, as a detail of a container transfer installation with a high-bay storage facility in the mode of construction according to FIGS. 3 and 4, the co-operation of gantry crane, take-over carriage, end distributor carriage in the mode of construction as a storage and retrieval unit, stationary transfer station and storage-facility crane, in a side view.

The take-over carriage 8 according to FIG. 6 is constructed as a two-level vehicle 8a (see also FIGS. 3 and 4) with constant spacing of the two levels 1 and 11 from one another. This applies in the same way to the storage and retrieval unit 9b as end distributor vehicle 9, the load receiving means 17a, 17b of which are adapted by the telescopic forks 20—which are constructed thereat as container transverse conveying means—in the vertical position thereof for suspended take-over of the containers 1 from the levels 1, 11 of the take-over carriage 8; 8a. Finally, the stationary transfer station 10 for receiving the transferred containers 1 also has an upper level 1 and a lower level 11, wherein the lower level 11 has a section 10a that extends in the direction of the container storage facility 3; 15, for a transverse conveying means 18.

The containers 1 fed by the load receiving means 7 of the gantry cranes 6 are deposited in both levels 1, 11 of the take-over carriage 8; 8a on transverse conveying carriages as transverse conveying means 18 and transversely conveyed or displaced up to the transfer point at the end distributor vehicle 9; 9b positioned in alignment in front of the take-over carriage 8; 8a, from where the containers suspended by means of the telescopic forks 20 (see FIG. 4, on the right outside the two storage and retrieval units 9b) are taken over from the two levels 1, 11. The transverse conveying carriages 18 are, after take-over of the containers 1 by the storage and retrieval unit 9b or end distributor vehicle 9, moved back to the starting position thereof for reloading with containers 1, as indicated by the double arrows in FIG. 6. Directly after transfer of the containers 1 the end distributor vehicle 9 or storage and retrieval unit 9b can be moved into an aligned position with the levels 1, 11 of one of the stationary transfer stations 10 and positioned thereat. Through reversal of the direction of the telescopic forks 20 the containers 1 are deposited at the upper level 1 and on a transverse conveying carriage 18 of the lower level 11 of the stationary transfer station 10. The transverse conveying carriage 18 is moved on the projecting section 10a offset with respect to the container deposited at the upper level 1 so that the storage-facility crane 12 has, by the lifting means 11 thereof, free access to the containers 1 of both levels 1, 11. As indicated by the directional arrow 21 in FIG. 6 the storage-facility crane 12 is movable in a high-bay storage facility 15 to extend over lanes and delivers the containers 1 for storage in the bays to storage and retrieval units 22 movable in the lanes, i.e. orthogonally to the directional arrow 21, of the high-bay storage facility 102.

Figure 7:
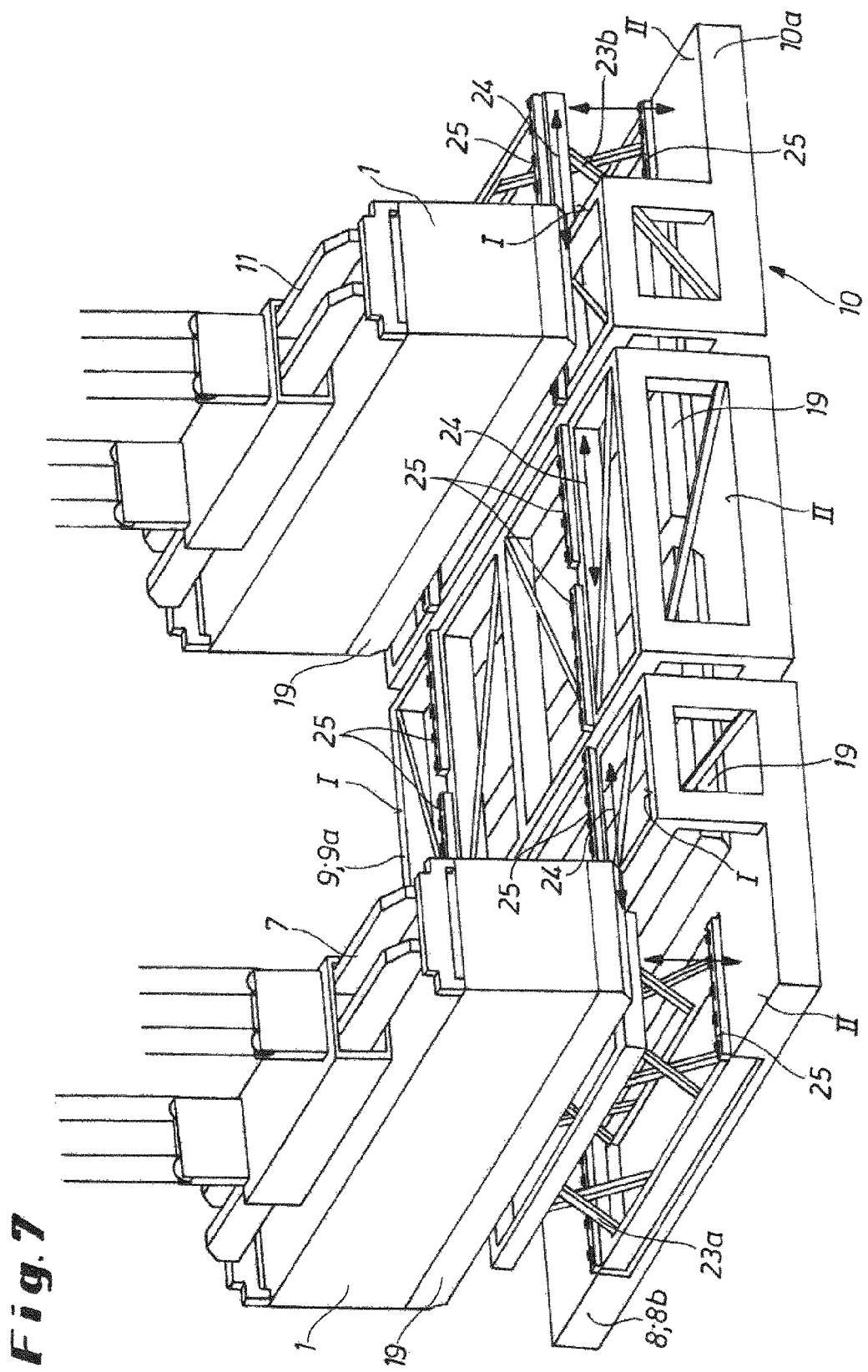
FIG. 7 shows, in a perspective plan view as a detail of the container transfer installation of FIGS. 1 and 2 or FIG. 5, the co-operation of take-over carriage, an end distributor carriage of modular construction and a stationary transfer station.

FIG. 7 shows another mode of construction of the components constructed with the upper and lower receiving and conveying levels 1, 11. The take-over carriage 8 is constructed as a part-level lowering vehicle 8b and has a part-level section, which is lowerable from the upper level 1 to the lower level 11 and conversely raisable, in the form a scissor lifting table 23a. The projecting transverse conveying section 10a of the stationary transfer station 10 is also constructed with a scissor lifting table 23b lowerable from the upper level 1 to the lower level 11 and conversely raisable.

The end distributor vehicle 9 is of flat modular construction 9a and constructed with a constant spacing of the two levels 1 and 11 from one another. For transverse conveying of the containers 1, rollers or roller tracks enabling conveying in both directions as indicated by the horizontal directional arrows 24 are provided at both levels 1, 11 to supplement all components. In this mode of construction the unloaded pallets 19 can be lowered in the projecting transverse conveying section 10a of the stationary transfer station 10 from the upper level 1 to the lower level 11 and conducted from there back to the lower level 11 of the end distributor vehicle 9 or 9a. As soon as the end distributor vehicle 9a, 9a has then been positioned in front of the take-over carriage 8 or the part-level lowering vehicle 8b, the foremost pallet can be brought onto the scissor lifting table 23a disposed in the lower level 11 and through raising of the scissor lifting table 23a readied on the non-lowerable part section of the upper level 1 for fresh loading with a pallet 1. The scissor lifting table 23a is thereafter lowered again to the lower level 11 so that the next pallet is taken over and, after lifting to the upper level 1, available for subsequent loading. In the modular construction 9a the end distributor vehicle 9 thus also serves, additionally to container distribution, as a coupling element for a closed pallet circuit, in particular on the one hand in co-operation with the stationary transfer station 10 and on the other hand with the take-over carriage 8 or 8b, wherein the pallet return after vertical lowering takes place exclusively in the lower levels 11 and the horizontal transverse conveying transport of the containers deposited on the pallets only in or at the upper levels of the components.

The invention claimed is:
1. A method of storage and retrieval or return of containers in high-bay or block storage facilities of a seaport or an inland port within a container transfer installation having an integrated fully automated container transport system comprising, for transfer of the containers from a ship to land and conversely, a gantry crane and a storage-facility crane that can retrieve the containers from or put the containers back in the storage facility, the method comprising the steps of:

providing a plurality of levels for the containers between the gantry crane and the storage-facility crane;

delivering the containers one at a time with the gantry crane successively to pallets or transverse conveying carriages provided on a take-over carriage having an upper receiving level and a lower conveying level and movable parallel to the container storage facility;

transferring from the take-over carriage the pallets laden with a container by pallet transverse conveying means or by the transverse conveying carriages of the take-over carriage to an end distributor vehicle movable parallel to the container storage facility and positioned in line in front of the take-over carriage and that like the take-over carriage has an upper level and a lower level; and transferring the containers from the end distributor vehicle by the transverse conveying means to a stationary transfer station that also has an upper level and a lower level and lifting the containers from the stationary transfer station by the storage-facility crane for storage in the container storage facility.

2. The method according to claim 1, wherein the take-over carriage and the end distributor vehicle are moved on rails.

3. The method according to claim 1, wherein when the container storage facility is constructed as a high-bay storage facility with multiple floors, the take-over carriage and the end distributor vehicle are moved on elevated rails and the stationary transfer station is provided in two uppermost floors of the high-bay storage facility, take-over levels that correspond with the two levels of the take-over carriage of the end distributor vehicle can be vertically fixed or vertically adjustable load receiving means of the end distributor vehicle positioned on the respective level to be serviced.

4. The method according to claim 1, wherein a front section facing a the quay side of the pallet transverse conveying means of the take-over carriage and a rear section facing the container storage facility of the pallet transverse conveying means of the stationary transfer station can be raised or lowered from the lower level to the upper level, the pallet transverse conveying means in both lowered and raised end positions thereof extending in alignment with pallet transverse conveying means of the interposed end distributor vehicle.

5. The method according to claim 4, wherein empty pallets, after lowering to the lower level from the stationary transfer station, can be conveyed by the lower level of the end distributor vehicle back to the lower level of the take-over carriage, where after raising to the upper level they are reloaded with a container.

6. A container transfer installation with an integrated fully automated container transport system for storage and retrieval or return of containers in high-bay or block storage facilities of a seaport or an inland port comprising, for transfer of the containers from a ship to land and conversely, a gantry crane and a storage-facility crane by which the containers are stored and retrieved or put back in the storage facility, a plurality of levels being provided for the containers between the gantry crane and the storage-facility cranes, the installation comprising, associated with the gantry crane toward the container storage facility on respective tracks extending parallel to the container storage facility:

a take-over carriage and, adjacent to the container storage facility, an end distributor vehicle movable independently of the take-over carriage and positionable in alignment with a stationary transfer station formed at least at an intake side of the container storage facility and arranged in an operating range of the storage-facility crane, the take-over carriage, the end distributor vehicle and the stationary transfer station being constructed with an upper receiving level and lower conveying level and a container and/or pallet transverse conveying means provided thereat.

7. The container transfer installation according to claim 6, wherein the take-over carriage and the end distributor vehicle are movable on elevated rails when the container storage facility is constructed as a high-bay storage facility.

8. The container transfer installation according to claim 6, wherein the levels of the take-over carriage are provided at a fixed spacing from one another and the end distributor vehicle is constructed as a storage and retrieval unit with an upper and a lower load receiving means with transverse conveying means or a vertically adjustable load receiving means for successive removal and transverse conveying of the containers from the upper level and lower level of the take-over carriage.

9. The container transfer installation according to claim 8, wherein the stationary transfer station has in the lower receiving level a transverse conveying section projecting relative to the upper receiving level toward the container storage facility.

10. The container transfer installation according to claim 6, wherein the take-over carriage is constructed with an upper level having a front part-level section lowerable from the upper to the lower level and conversely, the end distributor carriage being constructed with a continuous upper level receiving the containers fed from the take-over carriage and the projecting transverse conveyor section of the stationary transfer station being constructed with a lifting means lowerable from the upper level to the lower level and conversely.

11. The container transfer installation according to claim 10, wherein the front part-level section of the take-over carriage and the projecting transverse conveying section of the stationary transfer station are constructed with scissor lifting tables.

12. The container transfer installation according to claim 6, wherein the transverse conveying means transporting the deposited containers are constructed as transverse conveying carriages or the transverse conveying means transporting the containers deposited on pallets are constructed as rollers or roller tracks.

* * * * *